(12) United States Patent
Loberg et al.

(10) Patent No.: US 10,467,814 B2
(45) Date of Patent: Nov. 5, 2019

(54) MIXED-REALITY ARCHITECTURAL DESIGN ENVIRONMENT

(71) Applicant: DIRTT ENVIRONMENTAL SOLUTIONS, LTD., Calgary (CA)

(72) Inventors: Barrie A. Loberg, Millarville (CA); Joseph Howell, Uintah, UT (US); Robert Blodgett, Salt Lake City, UT (US); Simon Francis Stannus, Millcreek, UT (US); Matthew Hibberd, Sheffield (GB); Tyler West, Calgary (CA)

(73) Assignee: DIRTT Environmental Solutions, Ltd., Calgary (CA)

( * ) Notice: Subject to any disclaimer, the term of this patent is extended or adjusted under 35 U.S.C. 154(b) by 7 days.

(21) Appl. No.: 15/741,488

(22) PCT Filed: Jun. 9, 2017

(86) PCT No.: PCT/US2017/036838
§ 371 (c)(1),
(2) Date: Jan. 2, 2018

(87) PCT Pub. No.: WO2017/214559
PCT Pub. Date: Dec. 14, 2017

(65) Prior Publication Data
US 2018/0197341 A1 Jul. 12, 2018

Related U.S. Application Data

(60) Provisional application No. 62/348,716, filed on Jun. 10, 2016.

(51) Int. Cl.
*G06T 19/00* (2011.01)
*G06T 15/04* (2011.01)
(Continued)

(52) U.S. Cl.
CPC ............ *G06T 19/006* (2013.01); *G06T 15/04* (2013.01); *G06T 15/10* (2013.01); *G06F 3/017* (2013.01);
(Continued)

(58) Field of Classification Search
None
See application file for complete search history.

(56) References Cited

U.S. PATENT DOCUMENTS

2002/0033845 A1   3/2002   Elber et al.
2005/0276444 A1   12/2005  Zhou et al.
(Continued)

FOREIGN PATENT DOCUMENTS

CN   102495959   6/2012
EP   2662839     11/2013
(Continued)

OTHER PUBLICATIONS

Written Opinion for application No. 11201703011V dated on Jun. 26, 2018.
(Continued)

*Primary Examiner* — YuJang Tswei
(74) *Attorney, Agent, or Firm* — Workman Nydegger (57) ABSTRACT

A computer system for managing multiple distinct perspectives within a mixed-reality design environment loads a three-dimensional architectural model into memory. The three-dimensional architectural model is associated with a virtual coordinate system. The three-dimensional architectural model comprises at least one virtual object that is associated with an independently executable software object that comprises independent variables and functions that are specific to a particular architectural element that is represented by the at least one virtual object. The computer system associates the virtual coordinate system with a
(Continued)

physical coordinate system within a real-world environment. The computer system transmits to each device of multiple different devices rendering information. The rendering information comprises three-dimensional image data for rendering the three-dimensional architectural model and coordinate information that maps the virtual coordinate system to the physical coordinate system.

20 Claims, 6 Drawing Sheets

(51) Int. Cl.
*G06T 15/10* (2011.01)
*G06F 3/01* (2006.01)
*G06F 3/0484* (2013.01)

(52) U.S. Cl.
CPC ...... *G06F 3/04842* (2013.01); *G06T 2210/04* (2013.01)

(56) References Cited

U.S. PATENT DOCUMENTS

| | | | |
|---|---|---|---|
| 2009/0046140 A1 | 2/2009 | Lashmet | |
| 2010/0125799 A1* | 5/2010 | Roberts | G06F 3/011 715/757 |
| 2010/0253679 A1 | 10/2010 | Vyakhirev | |
| 2010/0289817 A1 | 11/2010 | Meier et al. | |
| 2012/0212400 A1 | 8/2012 | Border | |
| 2012/0268463 A1 | 10/2012 | Loberg | |
| 2012/0310602 A1 | 12/2012 | Jacobi | |
| 2013/0141421 A1* | 6/2013 | Mount | H04N 21/41407 345/419 |
| 2013/0179841 A1 | 7/2013 | Mutton | |
| 2013/0278631 A1 | 10/2013 | Border | |
| 2013/0286004 A1 | 10/2013 | McCulloch et al. | |
| 2013/0300637 A1* | 11/2013 | Smits | G03B 35/18 345/8 |
| 2014/0114845 A1 | 4/2014 | Rogers et al. | |
| 2014/0132595 A1 | 5/2014 | Boulanger | |
| 2014/0221090 A1 | 8/2014 | Mutschler | |
| 2014/0368532 A1 | 12/2014 | Keane et al. | |
| 2015/0097719 A1 | 4/2015 | Balachandreswaran | |
| 2015/0116316 A1 | 4/2015 | Fitzgerald | |
| 2016/0026253 A1* | 1/2016 | Bradski | G02B 27/225 345/8 |
| 2016/0257000 A1 | 9/2016 | Guerin | |
| 2016/0300392 A1 | 10/2016 | Jonczyk | |
| 2016/0317866 A1 | 11/2016 | Fung | |
| 2017/0308626 A1 | 10/2017 | Loberg | |

FOREIGN PATENT DOCUMENTS

| | | |
|---|---|---|
| WO | 2014116231 | 7/2014 |
| WO | 2017214576 | 12/2017 |

OTHER PUBLICATIONS

Final Office Action for U.S. Appl. No. 15/518,378 dated Feb. 7, 2019.
Mikael Johansson et al: "From BIM to VR—Integrating immersive visualizations in the current design process", Fusion—Proceedings of the 32nd ECAADE Conference—vol. 2 (EXAADE 2014), Sep. 12, 2014 (Sep. 12, 2014), p. 261, XP055473701, ISBN: 978-94-912-0706-8.
Mackinlay J D et al: "Rapid Controlled Movement Through a Virtual 3D Workspace", Computer Hraphics, ACM, US. vol. 24, No. 4, Aug. 6, 1990 (Aug. 6, 1990), pp. 171-176, XP000603087, ISSN: 0097-8930.
Frank Steinicke et al: "Human Walking in Virtual Environments: Perception, Technology, and Applications", May 27, 2014 (May 27, 2041), Springer New York, New York, XP055445675, ISBN: 978-1-4939-0011-4, pp. 221-262, Section 10.3.1: One-to-One Mappings; p. 225.
Supplementary Search Report for application No. EP15850198.1 dated May 22, 2018.
International Search Report and Written Opinion for PCT/US2015/05587 dated Jan. 27, 2016.
International Search Report and Written Opinion for PCT/US2017/036871 dated Sep. 14, 2017.
Singapore Search Report for Application No. 11201703011V dated Nov. 13, 2017.
Office Action for U.S. Appl. No. 15/518,318, filed Aug. 27, 2018.
Non-final Office Action for U.S. Appl. No. 15/518,378 dated Jun. 10, 2019.

* cited by examiner

MIXED-REALITY ARCHITECTURAL DESIGN ENVIRONMENT

CROSS-REFERENCE TO RELATED APPLICATIONS

The present invention is a 35 U.S.C. § 371 U.S. National Stage of PCT Application No. PCT/US2017/036838, filed Jun. 9, 2017, which claims the benefit of U.S. Patent Application No. 62/348,716, filed on Jun. 10, 2016, and entitled MIXED-REALITY ARCHITECTURAL DESIGN ENVIRONMENT, the entire content which is incorporated herein by reference.

BACKGROUND

As computerized systems have increased in popularity, so have the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers ("or designers") use a wide range of computer-aided design (CAD) software or building information (BIM) software (i.e., "architectural design software applications") for designing the aesthetic as well as functional aspects of a given residential or commercial space. For example, a designer might use a CAD or BIM program to design a building or part of a building, and then utilize drawings or other information from that program to order or manufacture building components.

One particular benefit that is offered by modern CAD and BIM software is the ability to see a three-dimensional rendering of an architectural design. This can provide tremendous value to designers and/or clients who wish to visualize a design before starting the actual building process. For example, in at least one conventional system, a user may be able to view on a computer screen a completely rendered office building. The user may be able to navigate within the three-dimensional renderings such that the user can view different perspectives and locations throughout the design.

While three-dimensional renderings can provide a user with a general idea regarding a final product, conventional three-dimensional renderings suffer from several shortcomings. For example, navigation of conventional three-dimensional renderings can be cumbersome as a user tries to achieve particular views of various features. Additionally, conventional systems may not be able to portray a true scale of a finished product. For example, a user's view of a conventional three-dimensional rendering on a computer screen may fall short of conveying a full appreciation for the scale of a particular feature or design.

Accordingly, there are a number of problems in the art that can be addressed.

BRIEF SUMMARY

Embodiments of the present invention comprise systems, methods, and apparatus configured to allow one or more users to navigate and interact with a three-dimensional rendering of an architectural design. In particular, implementations of the present invention comprise mixed-reality components that create a mixed-reality environment that immerses a user. For example, the mixed-reality components may comprise a headset that at least partially covers a user's eyes and tracks the viewing angle of the user's eyes and/or head movement, a mobile phone that displays, to a user, mixed-reality elements, or any other device capable of providing a user a view of a real-world environment and accompanying mixed-reality elements. As such, the mixed-reality components can be used to generate a mixed-reality environment that allows a user to interact with an architectural design within a real-world space.

Embodiments disclosed here include a computer system for managing multiple distinct perspectives within a mixed-reality design environment. The computer system loads a three-dimensional architectural model into memory. The three-dimensional architectural model is associated with a virtual coordinate system. The three-dimensional architectural model comprises at least one virtual object that is associated with an independently executable software object that comprises independent variables and functions that are specific to a particular architectural element that is represented by the at least one virtual object. The computer system associates the virtual coordinate system with a physical coordinate system within a real-world environment. The computer system transmits to each device of multiple different devices rendering information. The rendering information comprises three-dimensional image data for rendering the three-dimensional architectural model and coordinate information that maps the virtual coordinate system to the physical coordinate system.

Disclosed embodiments also comprise a system for managing multiple distinct perspectives within a mixed-reality design environment. The system includes a mixed-reality server that loads a three-dimensional architectural model into memory. The three-dimensional architectural model is associated with a virtual coordinate system. The three-dimensional architectural model also comprises at least one virtual object that is associated with an independently executable software object that comprises independent variables and functions that are specific to a particular architectural element that is represented by the at least one virtual object. The mixed-reality server associates the virtual coordinate system with a physical coordinate system within a real-world environment. The mixed-reality server then transmits rendering information to a first mixed-reality device and a second mixed reality device. The rendering information comprises three-dimensional image data comprising rendering instructions for the at least one virtual object within least a portion of the three-dimensional architectural model, and coordinate information that maps the virtual coordinate system to the physical coordinate system.

The first mixed-reality device renders a first mixed-reality environment from a first perspective that is unique to the first mixed-reality device. In response to a user input, the first mixed-reality device communicates a first ray to the mixed-reality server. Similarly, the second mixed-reality device renders a second mixed-reality environment from a second perspective that is unique to the second mixed-reality device. In response to a user input, the second mixed-reality device communicates a second ray to the mixed-reality server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments extend to systems, methods, and apparatus configured to allow one or more users to navigate and interact with a three-dimensional rendering of an architectural design. In particular, implementations of the present invention comprise mixed-reality components that create a mixed-reality environment that immerses a user. For example, the mixed-reality components may comprise a headset that at least partially covers a user's eyes and tracks the viewing angle of the user's eyes and/or head movement, a mobile phone that displays, to a user, mixed-reality elements, or any other device capable of providing a user a view of a real-world environment and accompanying mixed-reality elements. As such, the mixed-reality components can be used to generate a mixed-reality environment that allows a user to interact with an architectural design within a real-world space.

Disclosed embodiments include a mixed-reality architectural design system that injects mixed-reality elements into a real-world space. For example, a user may be interested in building out office space on an empty floor of a high-rise building. In various disclosed embodiments, the mixed-reality architectural design system injects mixed-reality elements into the floor space through the user's viewing device. The viewing device may comprise a mixed-reality headset, a virtual reality headset, a mobile phone display, or any other device capable of capturing the real-world space and rendering three-dimensional objects.

Disclosed embodiments allow a user to view virtual renderings of architectural designs within the real world. For instance, the mixed-reality architectural design system is capable of displaying to the user mixed-reality elements that include walls, furniture, lights, textures, and various other design elements that have been designed for the user's office. Additionally, the mixed-reality architectural design system is capable of receiving commands and presenting options to the user that manipulate and change the architectural design within the mixed-reality world. For example, while wearing a mixed-reality headset, the user may determine that a particular wall needs to be extended. Using appropriate input, which may include hand motions, eye motions, head movement, input through a keyboard, input through a touch interface, or other similar input, the user directs the mixed-reality architectural design system to extend the wall. In at least one embodiment, the mixed-reality architectural design system extends the wall in real-time such that the user sees the wall being extended within the mixed-reality environment.

Figure 1:
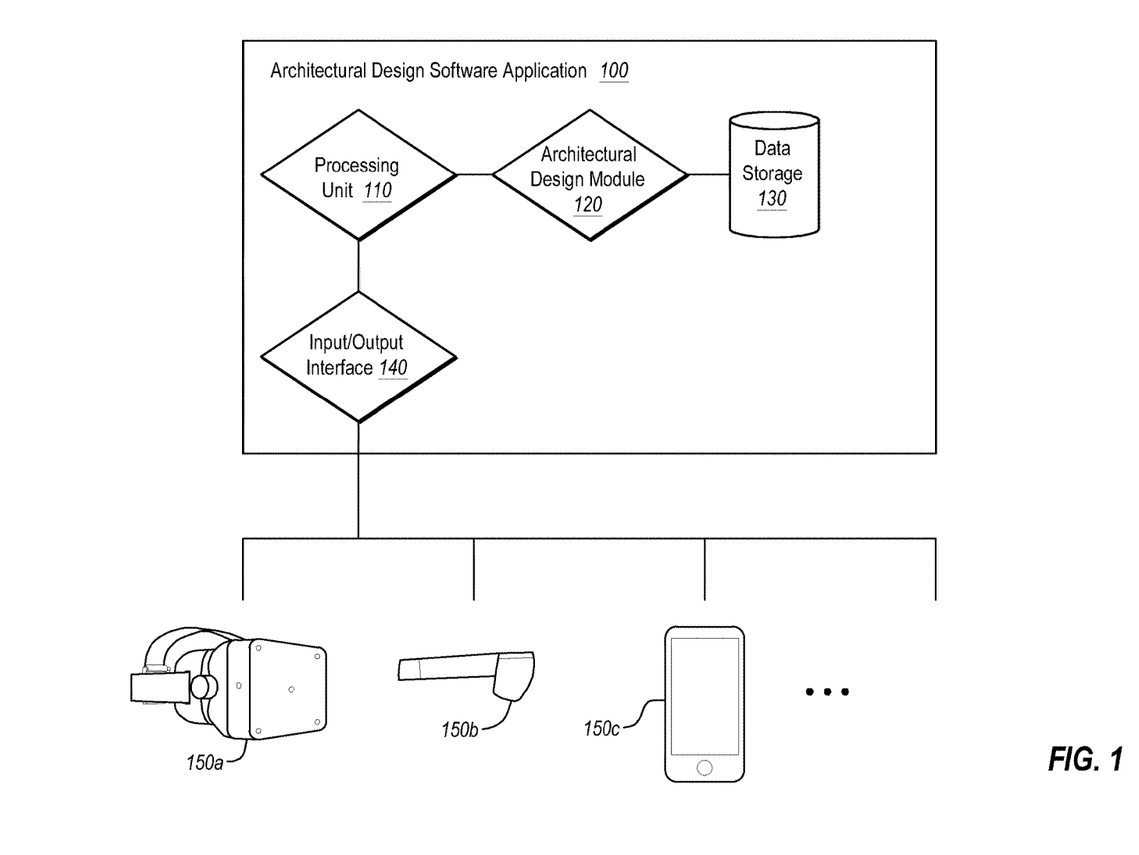
FIG. 1 illustrates a schematic diagram of an embodiment of an architectural design software application.

Turning now to the figures, FIG. 1 illustrates a schematic diagram of an embodiment of an architectural design software application 100 (also referred to herein as a mixed-reality architectural design system). The depicted architectural design software application 100 comprises various modules and components including a processing unit 110, an architectural design module 120, a data storage 130, and an input/output interface 140. One will understand, however, that the depicted modules and components are merely exemplary and are provided for the sake of explanation. In various additional or alternative embodiments, an architectural design software application 100 may comprise different configurations and descriptions of modules and components that are equivalent to those described herein.

As depicted, the architectural design software application 100 is in communication with various mixed-reality devices, including, a virtual-reality device 150a, an augmented-reality device 150b, and a smart phone 150c. As used herein, mixed-reality comprises any usage of computer generated elements that incorporate a virtual object within a user's real-world space. For example, mixed reality includes virtual reality where a user is completely immersed within a virtual world, augmented reality where a user is immersed within both a real-world space and a virtual space, and any other combination thereof of real-world and virtual elements.

The architectural design software application 100 allows a user to incorporate virtual elements within a real-world space. For example, the user can design an architectural model or schematic using conventional CAD systems and then interfacing with architectural design software application 100 through a mixed-reality environment. For example, the user can create an architectural design within a two-dimensional CAD interface. The two-dimensional design can be transformed into a three-dimensional model that can be incorporated into a mixed-reality environment. Similarly, the user may be able to view the two-dimensional design within the mixed-reality environment. Additionally, a user can also create a two- or three-dimensional architectural design within the mixed-reality environment by placing virtual architectural elements within the mixed-reality environment in real-time. For example, the user can cause a wall to be generated within the mixed-reality environment. An associated CAD file can then be updated to reflect the new wall. Accordingly, an entire architectural design can be created entirely within a mixed-reality environment.

In at least one embodiment, a processing unit 110 manages communication and interfacing between an input/output interface 140 and architectural design module 120. The architectural design module 120 may comprise a special-purpose CAD program or a conventional CAD program that is capable of exporting architectural design schematics. In various embodiments, the architectural design module 120 accesses architectural designs files that are stored within the data storage 130. As such, the architectural design module 120 can load a conventional architectural design file that is within design storage 120 and provide the file to processing unit 110.

The processing unit 110 then loads the three-dimensional architectural model into memory. In at least one embodiment, the three-dimensional architectural model comprises one or more architectural design elements that have been designed to fit within a real-world space. For example, the three-dimensional architectural model may comprise an entire building that has been designed to fit on a plot of land. In contrast, the three-dimensional architectural model may also comprise a design for the lobby of a business. The three-dimensional architectural model may include architectural design elements such as wiring, plumbing, wall position, furniture, lighting, and other related design features.

Additionally, in at least one embodiment, one or more of the architectural design elements are associated with independently executable software objects. The independently executable software objects are functional within the architectural design software application 100 to provide context and functionality specific to the individual architecture design elements with which each independently executable software object is associated.

By way of explanation, an independently executable software object comprises a set of computer-executable instructions used in object-oriented program code, and which relate to a particular physical component or feature. In addition, software objects can be interrelated via parent/child dependency relationships where changes in a parent object flow through to a child object and vice versa. For example, a software object created for a table may have several child objects for each leg.

In other cases, the software objects can be related to other software objects that represent physically proximate components (e.g., a wall object that is positioned next to the table object). For example, the above-mentioned table software object and leg software objects can independently execute in a correlated fashion to ensure each corresponding physical component (i.e., the table top, or the table legs) is positioned appropriately, or otherwise colored and designed consistent with the user's specifications. For instance, a leg software object can identify that its location next to a wall renders a physical leg unnecessary, and accordingly can automatically incorporate a bracket to attach directly to the wall in place of a physical leg.

As such, each independently executable software object comprises independent variables and functions that are specific to the particular architectural element that is represented by the at least one virtual object. For example, the exemplary table from above may be associated with a selection of possible woods. The independently executable software object associated with the table, may comprise variables that are associated with the different possible woods and also the functions necessary to switch between the different possible woods.

Additionally, in at least one embodiment, the processing unit 110 generates a coordinate system that associates a virtual coordinate system within the architectural design schematic with a physical coordinate system with a real-world environment. For example, the processing unit 110 may generate a coordinate system that associates the architectural schematic for a user's planned office space with a physical coordinates system that is associated with the physical office space itself. As such, when rendering the mixed-reality elements that are associated with the architectural design schematic, the elements appear within the correct position within the real-world environment due to the common coordinate system generated by the processing unit 110.

The processing unit 110 then transmits to the input/out interface (and on to the mixed-reality devices 150(*a-c*)) rendering information. The rendering information comprises three-dimensional model data describing at least a portion of the three-dimensional architectural model and coordinate information that maps the virtual coordinate system to the physical coordinate system. In at least one embodiment, the three-dimensional model data consists of geometry information and texture information describing objects within the three-dimensional architectural model. As such, in at least one embodiment, the mixed-reality devices 150(*a-c*) are only rendering received geometries and textures without any metadata or knowledge about the independently executable software objects or other attributes associated with the architectural elements. In contrast to providing the entire data available within the CAD file, providing only geometries and textures provides several significant technical benefits, such as requiring significantly less processing power at the mixed-reality devices 150(*a-c*) and requiring less bandwidth to communicate the information.

Figure 2:
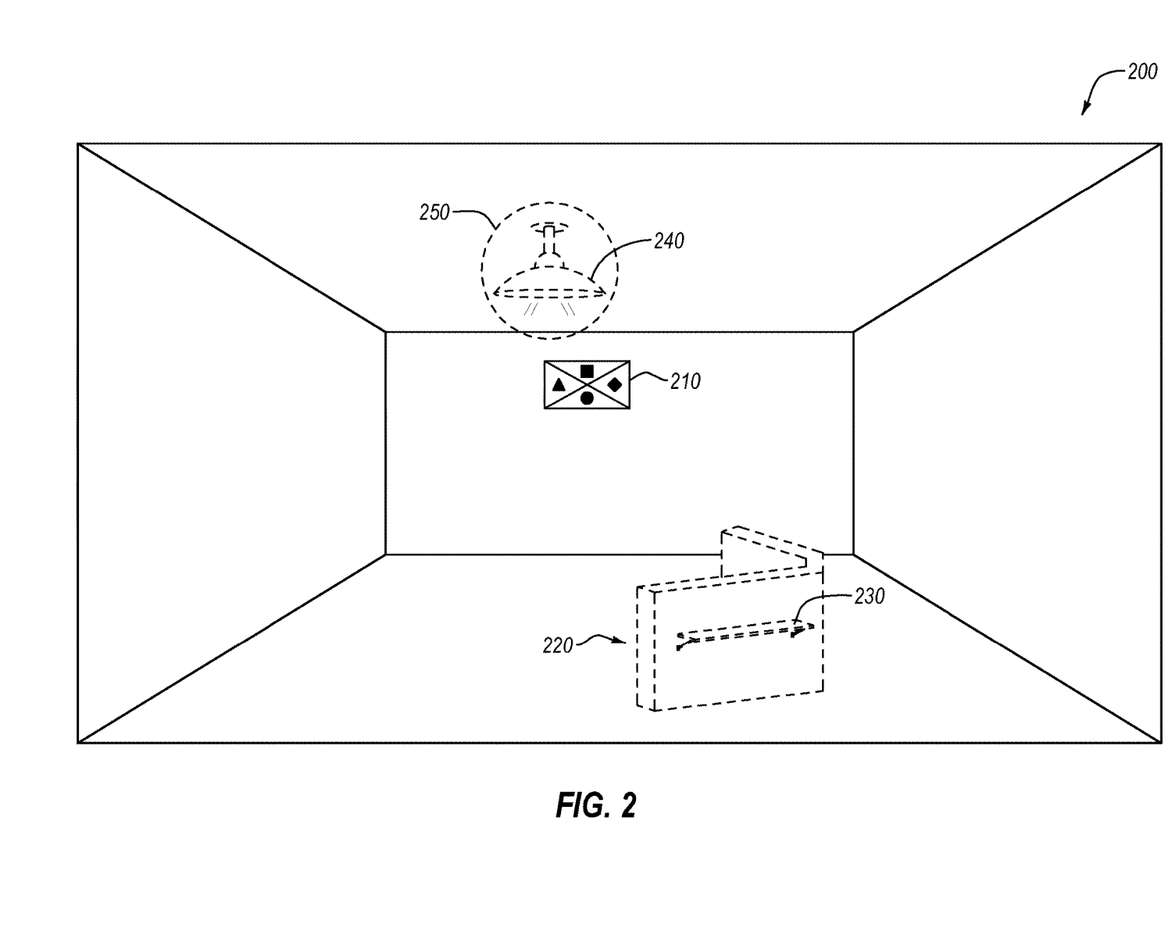
FIG. 2 illustrates a user's view of a room within an embodiment of a mixed-reality environment.

FIG. 2 illustrates a user's view of a room within a mixed-reality environment 200. In particular, FIG. 2 depicts an empty room that comprises various virtual elements 220, 230, 240. As used herein, a virtual element, also referred to as a virtual object, comprises a rendered object within the mixed-reality environment 200. In contrast, a real-world element comprises a physical object within the mixed-reality environment 200. The depicted room comprises a triangle shaped cubicle 220 with an associated desk surface 230 and a light fixture 240. In addition to the virtual elements 220, 230, 240 within the room. The room also comprises a real-world element in the form of real-world target 210.

In at least one embodiment, before a virtual element is displayed to a user, the user must point their mixed-reality device 150 (*a-c*) at the target 210 within the physical world. The location of the target 210 within the physical world is known to the processing unit 110. As such, the processing unit 110 can generate the shared coordinate system between the three-dimensional model (i.e., the mixed-reality elements) and the real-world room.

In various additional or alternative embodiments, the target 210 may comprise a set of lights, a particular symbol, or known objects within the real-world environment. For example, in at least one embodiment, a user may utilize the mixed-reality device outdoors to view a proposed building that is to be built. The mixed-reality device may utilize a real-world building, or some other physical landmark, as a target. The processing unit 110 may also be aware of the location of the currently built building and thus can generate a common coordinate system. In at least one embodiment, however, a target 210 is not necessary to generate a common coordinate system. For example, in at least one embodiment, one or more of an electronic compass, an altimeter, a GPS, a Wi-Fi receiver, a BLUETOOTH receiver, or some other location aware device may be sufficient to generate a common coordinate system.

In addition to allowing a user to view virtual elements within the real-world environment in which the virtual elements are designed to fit, disclosed embodiments also provide tools for a user to interact with and change the virtual elements. For example, area 250 depicts a particular portion of the mixed-reality environment that a user desires to interact with. Various different methods can be utilized by the user to select the area. For example, the user may point at the area, the user may make a pinching motion over the area, the user may select the area with an interface device integrated within the mixed-reality device 150(*a-c*) or through any other method suitable for interacting with a mixed-reality element.

Figure 3:
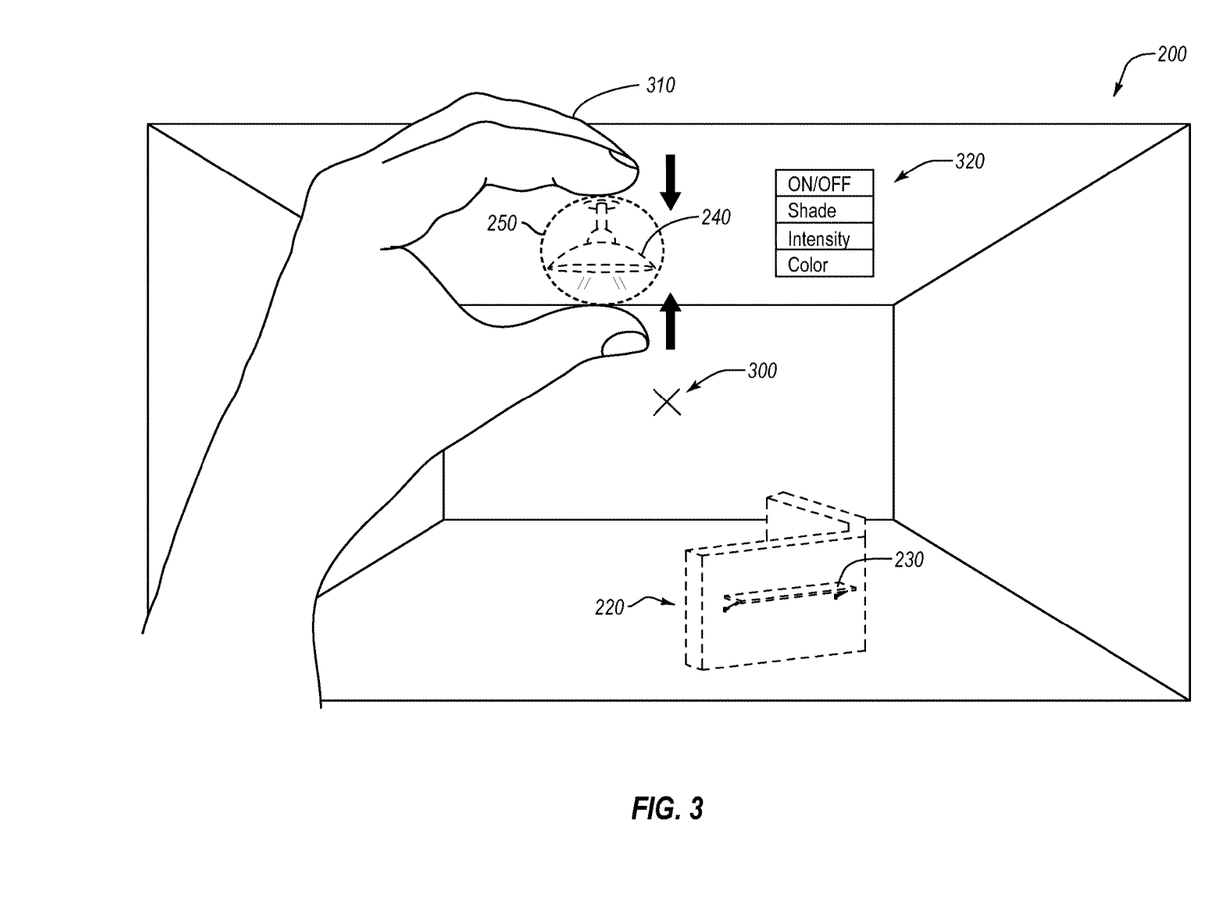
FIG. 3 illustrates a user interacting with the mixed-reality environment depicted in FIG. 2.

As depicted in FIG. 3, in at least one embodiment, the user interacts with the mixed-reality light fixture 240 by making a pinching motion with their hand 310 that intersects at the lighting fixture 240 within the user's view. Upon making the pinching motion, the user's mixed-reality device 150(*a-c*) calculates a ray that extends from a particular portion 300 of the user's perspective towards the direction in which the user pinched, or in this case, towards area 250.

Figure 4:
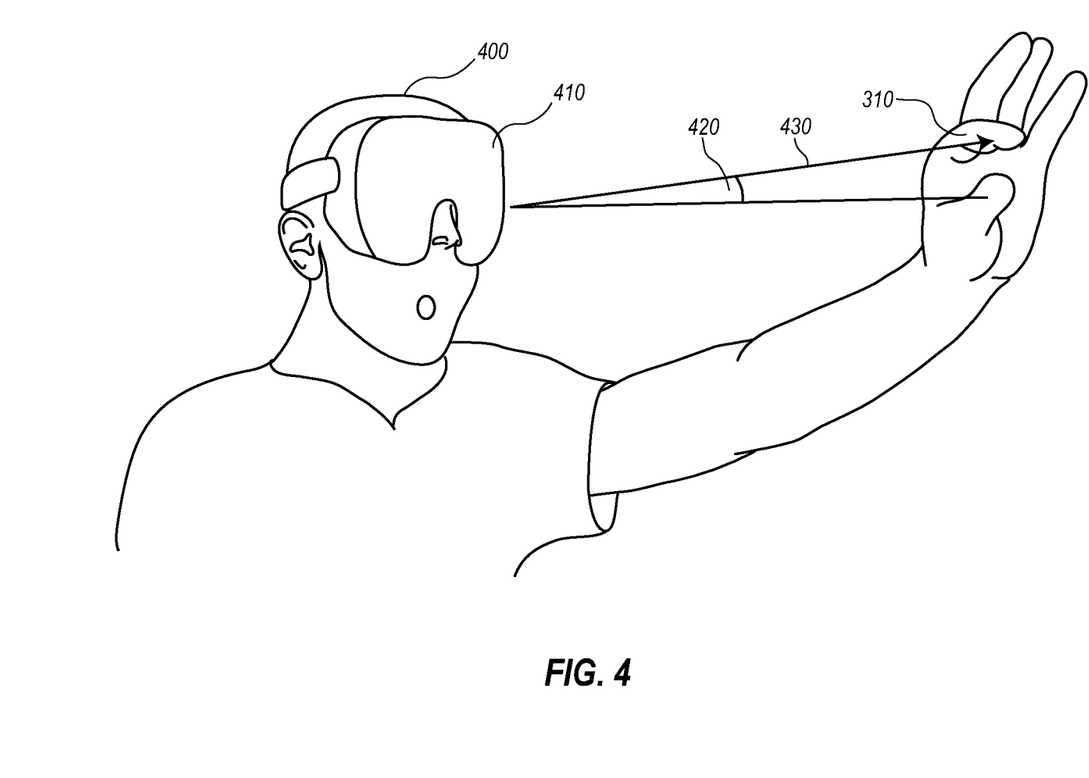
FIG. 4 illustrates an embodiment of a user interfacing with a mixed-reality environment.
Figure 5:
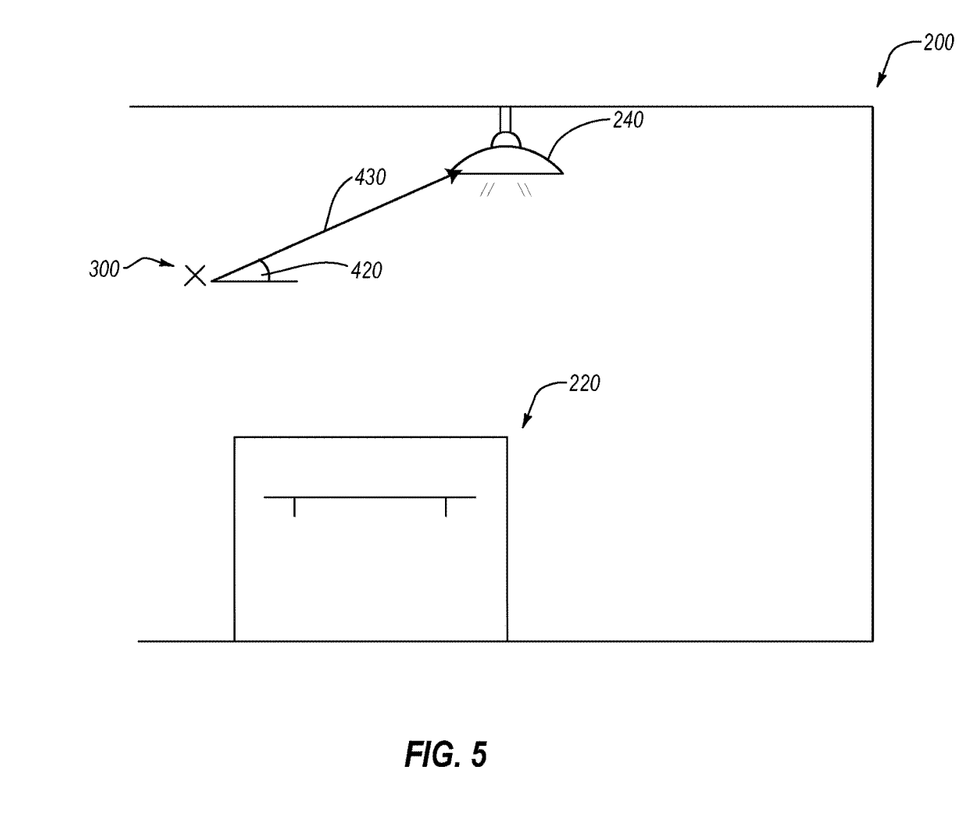
FIG. 5 illustrates a schematic of a user interaction with the mixed-reality environment depicted in FIG. 2.

FIG. 4 illustrates a different perspective of a user 400 interfacing with the mixed-reality environment 200 of FIG. 3. As depicted, the user 400 is wearing a head-mounted display 410 through which virtual elements are rendered. The user makes a pinching motion with his hand 310. Upon identifying the pinching motion, the processing unit 110 calculates an angle 420 that indicates the direction of the ray 430 relative to center of the user's field-of-view (e.g., particular portion 300). One will appreciate that similar functionality can be accomplished with a video camera and display on a smart phone, where an angle 420 is calculated from the center point of the user's view within the display.

Once the angle 420 is identified, the ray 430 can be fully described using only the angle 420 and the coordinates of the center of the user's field-of-view. One will appreciate that the coordinates could also be associated with a location other than the center of the user's field-of-view. In at least one embodiment, the coordinates comprise coordinates within either the virtual coordinate system or the physical coordinate system, which the processing unit 110 is able to interchange between. Additionally, in at least one embodiment, the angle 420 comprises an angle within three-dimensional space. For example, the angle 420 may be associated with multiple individual values that properly place the angle within the physical coordinate system or the virtual coordinate system.

In at least one embodiment, once the ray 430 is identified, the user's mixed-reality device (i.e., head-mounted display 410) communicates the ray 430 to the processing unit 110. The processing unit 110 then extends the ray within the three-dimensional architectural model until it intersects the at least one virtual object. For example, the processing unit 110 is aware of the entire mixed-reality environment. Using this awareness, the processing unit 110 is capable of determining whether the ray intersects with a virtual object, such as the light fixture 240. As such, in at least one embodiment, upon receiving a user input (e.g., the pinching motion), the mixed-reality device communicates only a ray 430 generated from the user input to the processing unit 110. The processing unit 110 then determines what virtual object the user is interacting with by extending the ray until it intersects with the target virtual object.

Upon identifying the intersected object (in this example the light fixture 240), the processing unit 110 identifies one or more functions associated with the independently executable software object that is associated with the at least one virtual object. For example, the independently executable software object associated with light fixture 240 comprises functions for selecting the color of the light shade, the color of the light, the intensity of the light, whether the light is on or off, and various other similar attributes.

The processing unit 110 then generates the necessary rendering information for the user's mixed-reality device to generate a command interface within the three-dimensional architectural model that depicts one or more commands related to the one or more functions. For example, FIG. 3 depicts a command interface 320 that indicates various functions that can be performed on the light fixture 240. In at least one embodiment, the same methods and systems described above are used by the user to select a particular option in the command interface 320. For example, the user can simply make a pinching motion over the command of choice.

One will appreciate, in view of the above, that disclosed embodiments provide a highly efficient system for communicating a three-dimensional architectural model to one or more users and allowing them to interact with the model. For example, in at least one embodiment, several dozen or even hundreds of users may be viewing an architectural model of a building using their own mobile phones. One will appreciate the tremendous amount of bandwidth it would require to communicate the entire model to each device.

Instead of communicating the entire model to each device, disclosed embodiments communicate only textures, geometries, and coordinate systems to the mixed-reality system. Further, in some embodiments, the architectural design software application 100 only communicates the portions of the textures and geometries needed to each individual device. As such, each device may comprise different textures and geometries, but each device can receive additional textures and geometries as needed.

Further, in at least one embodiment, each user is capable of interacting with the three-dimensional architectural model by simply communicating rays to the architectural design software application 100. The processing unit 110 then determines what virtual objects the respective rays intersect with, and communicates back to the respective mixed-reality devices the textures and geometries necessary to render the respective command interfaces. In at least one embodiment, each respective command interface is only rendered by the mixed-reality device with which it is associated. Accordingly, disclosure embodiments utilize a highly efficient method of communicating data that removes heavy processing loads from the individual mixed-reality devices.

In at least one embodiment, executing the command comprises changing the three-dimensional architectural model in some way. Once the model is changed, the architectural design module 120 communicates the updated model to the processing unit 110. The processing unit 110 then communicates an updated rendering information 200 to the user, and any other users also within the same mixed-reality environment. In at least one embodiment, to conserve bandwidth, the processing unit 110 only communicates the updated portions of the mixed-reality environment and only communicates it to users who are likely to view the updated portions.

As such, in various embodiments, a user can manipulate an architectural design from within a mixed-reality environment. The respective changes can be made within an architectural design module 120, which updates a corresponding CAD file. Additionally, the changes can be propagated simultaneously to multiple mixed-reality devices 150(*a-c*) for viewing in real time. Further, bandwidth and processing power can be conserved by communicating only textures and geometries to the mixed-reality devices 150(*a-c*), and, in turn, primarily communicating rays back to the architectural design software application 100 for interpretation into specific commands and requests.

As mentioned above, in various embodiments, multiple mixed-reality devices 150(*a-c*) can be within the same mixed-reality environment 200 simultaneously. For example, in at least one embodiment, a first user may be utilizing an augmented reality headset 150*b* within mixed-reality environment 200, while a large group of other users are experiencing the mixed-reality environment 200 through their mobile phones 150*c*. For example, the other group of users may hold their phones before their faces and see the mixed-reality elements displayed within the viewing screen of their phone in the mixed-reality environment 200.

Additionally, various motion tracking sensors within the phones may allow the users to move around and change perspective with respect to the mixed-reality environment. Similarly, as described above, in at least one embodiment, one or more of the users with phones may be able to simultaneously manipulate and change the mixed-reality environment by issuing commands from their phones. For example, a user's phone can communicate rays to the architectural design software application 100, which processes the ray as described above.

Additionally, in at least one embodiment, fixed-cameras can be utilized within the mixed-reality environment. For example, the location and height of a camera can be entered into the architectural design software application 100. The architectural design software application 100 can then communicate the fixed camera's view to a display screen for individuals to view the mixed-reality environment. Additionally, in at least one embodiment, data received from the fixed camera can be used to control objects within the real-world environment. For example, an automated vacuum cleaner may receive a command to stop before running into a virtual wall that is not apparent to the vacuum cleaner, but is apparent within the mixed-reality environment from the perspective of the fixed camera.

Accordingly, FIGS. 1-5 and the corresponding text illustrate or otherwise describe one or more components, modules, and/or mechanisms for rendering a specular effect within a three-dimensional model. One will appreciate that disclosed embodiments can allow multiple users to view a mixed-reality environment while processing and receiving a minimal amount of information. The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
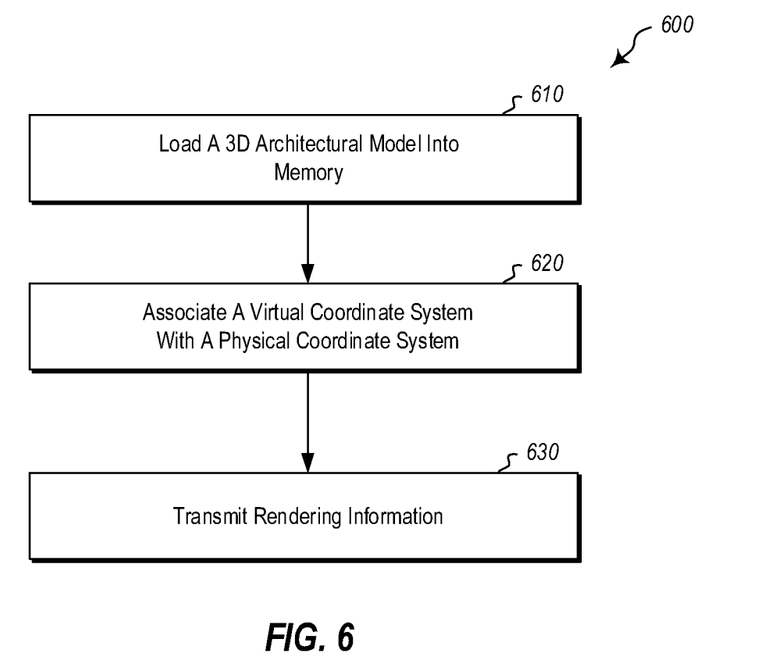
FIG. 6 illustrates a flowchart of a series of acts in an embodiment of a method for managing multiple distinct perspectives within a mixed-reality design environment.

For example, FIG. 6 illustrates that a method 600 for managing multiple distinct perspectives within a mixed-reality design environment includes an act 610 of loading a three-dimensional architectural model into memory. Act 610 comprises loading a three-dimensional architectural model into memory. The three-dimensional architectural model is associated with a virtual coordinate system. The three-dimensional architectural model comprises at least one virtual object that is associated with an independently executable software object that comprises independent variables and functions that are specific to a particular architectural element that is represented by the at least one virtual object. For example, as depicted and described with respect to FIGS. 1 and 2, the processing unit 110 loads into memory a three-dimensional architectural model that is associated with the room depicted in FIG. 2. An exemplary virtual object, the light fixture 240, is associated with independently executable software objects that include functions and variables describing the light fixture 240.

Additionally, method 600 includes an act 620 of associating a virtual coordinate system with a physical coordinate system. Act 620 comprises associating the virtual coordinate system with a physical coordinate system within a real-world environment. For example, as depicted and described with respect to FIGS. 1 and 2, a target 210 within the room is used to map a virtual coordinate system to a real-world coordinate system.

Method 600 also includes an act 630 of transmitting rendering information. Act 630 comprises transmitting to each device of multiple different devices rendering information. The rendering information comprises three-dimensional image data comprising rendering instructions for the at least one virtual object within at least a portion of the three-dimensional architectural model, and coordinate information that maps the virtual coordinate system to the physical coordinate system. For example, as depicted and described with respect to FIGS. 1-3, the processing unit communicates rendering information in the form of textures and geometries. The textures and geometries describe virtual objects such as lighting fixture 240.

Accordingly, embodiments disclosed herein include systems and methods for displaying and interacting with three-dimensional architectural designs within a mixed-reality environment. In particular, disclosed embodiments overcome several different technical challenges relating to processor limitations and bandwidth limitations when communicating with large numbers of devices and/or underpowered devices. For example, as described above, disclosed embodiments allow mixed-reality devices 150(*a-c*) to generate mixed-reality environments using only a common coordinate system and textures and geometries. As such, a user is able to intuitively and personally interact with an architectural design in real-time within an actual physical design space without requiring large amounts of processing power and bandwidth.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for managing multiple distinct perspectives within a mixed-reality design environment, comprising:
   one or more processors; and
   one or more computer-readable media having stored thereon executable instructions that when executed by the one or more processors configure the computer system to perform at least the following:
      load a three-dimensional architectural model into memory, wherein:
         the three-dimensional architectural model is associated with a virtual coordinate system, and
         the three-dimensional architectural model comprises at least one virtual object that is associated with an independently executable software object that comprises independent variables and functions that are specific to a particular architectural element that is represented by the at least one virtual object;
      associate the virtual coordinate system with a physical coordinate system within a real-world environment;
      transmit to each device of multiple different devices rendering information, wherein the rendering information comprises:
         three-dimensional image data comprising rendering instructions for the at least one virtual object within at least a portion of the three-dimensional architectural model, and
         coordinate information that maps the virtual coordinate system to the physical coordinate system
      receive from a particular device of the multiple different devices a ray that is determined based on a motion of a user's hand directed toward a rendered representation of the at least one virtual object and that extends from a particular portion of a user's field-of-view toward the rendered representation of the at least one virtual object;
      determine that the ray intersects with the rendered representation of the at least one virtual object; and
      identify one or more functions associated with the independently executable software object that is associated with the at least one virtual object.

2. The computer system as recited in claim 1, wherein the executable instructions include instructions that are executable to configure the computer system to:
   generate a command interface rendering within the three-dimensional architectural model that depicts one or more commands related to the one or more functions.

3. The computer system as recited in claim 1, wherein determining that the ray intersects with a rendered representation of the at least one virtual object, comprises:
- extending the ray within the three-dimensional architectural model until it intersects the at least one virtual object.

4. The computer system as recited in claim 2, wherein the command interface rendering is only generated within the three-dimensional architectural model that is rendered by the particular device.

5. The computer system as recited in claim 1, wherein the ray comprises coordinates within the three-dimensional architectural model and a direction.

6. The computer system as recited in claim 5, wherein the coordinates within the three-dimensional architectural model comprise a set of coordinates associated with a center of the user's field-of-view.

7. The computer system as recited in claim 1 wherein the executable instructions include instructions that are executable to configure the computer system to:
- update at least a portion of the three-dimensional architectural model;
- generate an updated three-dimensional image data that incorporates the updated portion; and
- transmit to each device of the multiple different devices updated rendering information, wherein the updated rendering information comprises the updated three-dimensional image data.

8. The computer system as recited in claim 1, wherein the three-dimensional image data consists of geometry information and texture information describing objects within the three-dimensional architectural model.

9. The computer system as recited in claim 1, wherein additional rendering information is only transmitted when a change is made to the three-dimensional architectural model.

10. A computer-implemented method for managing multiple distinct perspectives within a mixed-reality design environment, the method comprising:
- loading a three-dimensional architectural model into memory, wherein:
  - the three-dimensional architectural model is associated with a virtual coordinate system, and
  - the three-dimensional architectural model comprises at least one virtual object that is associated with an independently executable software object that comprises independent variables and functions that are specific to a particular architectural element that is represented by the at least one virtual object;
- associating the virtual coordinate system with a physical coordinate system within a real-world environment;
- transmitting to each device of multiple different devices rendering information, wherein the rendering information comprises:
  - three-dimensional image data comprising rendering instructions for the at least one virtual object within at least a portion of the three-dimensional architectural model, and
  - coordinate information that maps the virtual coordinate system to the physical coordinate system;
- receiving from a particular device of the multiple different devices a ray that is determined based on a motion of a user's hand directed toward a rendered representation of the at least one virtual object and that extends from a particular portion of a user's field-of-view toward the rendered representation of the at least one virtual object;
- determining that the ray intersects with the rendered representation of the at least one virtual object; and
- identifying one or more functions associated with the independently executable software object that is associated with the at least one virtual object.

11. The computer-implemented method as recited in claim 10, furthering comprising:
- generating a visual object within the three-dimensional architectural model that depicts one or more commands related to the one or more functions.

12. The computer-implemented method as recited in claim 10, further comprising:
- extending the ray within the three-dimensional architectural model until it intersects the at least one virtual object.

13. The computer-implemented method as recited in claim 11, wherein the visual object is only generated within the three-dimensional architectural model that is rendered by the particular device.

14. The computer-implemented method as recited in claim 10, wherein the ray comprises coordinates within the three-dimensional architectural model and a direction.

15. The computer-implemented method as recited in claim 14, wherein the coordinates within the three-dimensional architectural model comprises a set of coordinates associated with a center of the user's field-of-view.

16. The computer-implemented method as recited in claim 10 further comprising:
- updating at least a portion of the three-dimensional architectural model;
- generating an updated three-dimensional image data that incorporates the updated portion; and
- transmitting to each device of the multiple different devices updated rendering information, wherein the updated rendering information comprises the updated three-dimensional image data.

17. The computer-implemented method as recited in claim 10, wherein the three-dimensional image data consists of geometry information and texture information describing objects within the three-dimensional architectural model.

18. The computer-implemented method as recited in claim 10, wherein additional rendering information is only transmitted when a change is made to the three-dimensional architectural model.

19. A system for managing multiple distinct perspectives within a mixed-reality design environment, comprising:
- a mixed-reality server comprising executable instructions that when executed configure the mixed-reality server to perform at least the following:
  - load a three-dimensional architectural model into memory, wherein:
    - the three-dimensional architectural model is associated with a virtual coordinate system, and
    - the three-dimensional architectural model comprises at least one virtual object that is associated with an independently executable software object that comprises independent variables and functions that are specific to a particular architectural element that is represented by the at least one virtual object;
  - associate the virtual coordinate system with a physical coordinate system within a real-world environment; and
  - transmit rendering information to a first mixed-reality device and a second mixed reality device, wherein the rendering information comprises:

three-dimensional image data comprising rendering instructions for the at least one virtual object within at least a portion of the three-dimensional architectural model, and coordinate information that maps the virtual coordinate system to the physical coordinate system;

the first mixed-reality device comprising executable instructions that when executed configure the first mixed-reality device to perform at least the following:

based upon the three-dimensional image data, render a first mixed-reality environment from a first perspective that is unique to the first mixed-reality device; and in response to a first user input comprising a motion of a first user's hand directed toward a first rendered representation of the at least one virtual object, communicate a first ray to the mixed-reality server, wherein the first ray is determined based on the first user input and extends from a first particular portion of a first user's field-of-view toward the first rendered representation of the at least one virtual object; and the second mixed-reality device comprising executable instructions that when executed configure the second mixed-reality device to perform at least the following:

based upon the three-dimensional image data, render a second mixed-reality environment from a second perspective that is unique to the second mixed-reality device; and in response to a second user input comprising a motion of a second user's hand directed toward a second rendered representation of the at least one virtual object, communicate a second ray to the mixed-reality server, wherein the second ray is determined based on the second user input and extends from a second particular portion of a second user's field-of-view toward the second rendered representation of the at least one virtual object.

20. The system as recited in claim 19, wherein:

the first ray comprises a first set of coordinates associated with a center of the first user's field-of-view associated with the first mixed-reality device; and the second ray comprises a second set of coordinates associated with a center of the second user's field-of-view associated with the second mixed-reality device.

\* \* \* \* \*